United States Patent [19]

Itoh

[11] Patent Number: 5,356,202
[45] Date of Patent: Oct. 18, 1994

[54] ARRANGEMENT FOR MOUNTING A HEADREST IN SEAT

[75] Inventor: Yoshikazu Itoh, Akishima, Japan

[73] Assignee: Tachi-S Co. Ltd, Akishima, Japan

[21] Appl. No.: 849,952

[22] Filed: Mar. 12, 1992

[30] Foreign Application Priority Data

Mar. 1, 1991 [JP] Japan .................... 3-18351

[51] Int. Cl.⁵ ................................ A47C 1/10
[52] U.S. Cl. ........................ 297/391; 297/396
[58] Field of Search ............... 297/391, 396, 410

[56] References Cited

U.S. PATENT DOCUMENTS

| | | | |
|---|---|---|---|
| 4,688,852 | 8/1987 | Arai et al. | 297/410 |
| 5,000,283 | 3/1991 | Krieg | 297/378.1 X |
| 5,131,720 | 7/1992 | Nemoto | 297/410 |

FOREIGN PATENT DOCUMENTS

| | | |
|---|---|---|
| 74849 | 5/1983 | Japan . |
| 124146 | 5/1989 | Japan . |

*Primary Examiner*—José V. Chen
*Attorney, Agent, or Firm*—Oldham, Oldham & Wilson Co.

[57] ABSTRACT

An arrangement for mounting a cantilever-type headrest in a seat, in which the headrest is inclined at an angle compensating for an illusional headrest inclination which occurs in the eyes of a person looking at such cantilever-type headrest appearance. Further, the headrest is dislocated from a common central vertical line with respect to a seat back of the seat, to thereby offset an illusional headrest dislocation towards a side of seat back where there is no headrest stay.

1 Claim, 3 Drawing Sheets

ARRANGEMENT FOR MOUNTING A HEADREST IN SEAT

BACKGROUND OF INVENTION

1. Field of Invention

The present invention relates to a headrest for use in an automotive seat, and in particular to an arrangement for mounting a cantilever-like headrest on a seat back of the seat.

2. Description of Prior Art

FIGS. 1 and 2 show an example of conventional cantilever-like headrest (HR) mounted on a seat back (SB) of a seat such as an automotive seat.

While this sort of headrest is on a new fashionable trend for adding an aesthetic impression to the seat, there have been some objections on the users' part as to the design balance of such particular cantilever-like headrest in relation to the seat back.

This originates from an optical illusion. Namely, in the eyes of a person, the cantilever-like headrest is viewed as if its free end was inclined downwardly closer to the horizontal line of top edge of seat back from its other opposite end which is supported by a headrest stay (at P). As a result, the headrest per se is viewed as being inclined, giving an imbalance appearance relative to the seat back. Further, the illusion arises in the position of headrest relative to the seat back. That is, due to the disposition of stay (P) laterally of seat cushion, in the eyes of person, the headrest is seen as if it was dislocated from the center of headrest or located at a point closer to the side of seat back where there is no such headrest stay (P).

Specifically, by referring to FIG. 2, there is illustrated an ordinary arrangement of headrest (HR) upon the seat back (SB). Both headrest (HR) and seat back (SB) are formed in an ordinary manner, which means that the former generally represents a rectangular shape and so does the latter. Naturally, the headrest (HR) is disposed, via one headrest stay (P), such that the central vertical thereof is aligned with that of seat back (SB) along the vertical line (T1) as shown. Thus, the headrest (HR) is situated centrally of the seat back (SB) and a distance (H) therefrom by means of the stay (P) to constitute a cantilever-like headrest arrangement, with the headrest (HR) extending horizontally in a direction orthogonal to the central, vertical line (T1) and with the lower edge (b) of headrest (HR) laying in parallel with the upper edge (a) of seat back (SB).

However, as viewed from FIG. 2, the presence of stay (P) on the right-side portion of seat back (SB) causes an imbalance point at the other right-side portion of same seat back in terms of headrest location relative to the seat back (SB). Optically, both headrest (HR) and seat back (SB) extends their respective areas in a symmetrical fashion relative to the center (T1), hence presenting a stability in the eyes of a person who looks at them only. On the other hand, when looking at such symmetrically stable structure in conjunction with the right-side stay (P), it is inevitable that a non-stability or an imbalance should be felt at the left side of seat back (SB) in the person's eyes. This is mainly because there is no symmetrical arrangement as to the stay (P), providing thus an asymmetric contrast to the symmetrical design, and causing a distortion spot therebetween in the eyes. Because of that optical illusion, the eyes and associated nervous system in a person who looks at this headrest arrangement should instinctly intend to see a support at the left-side free end of headrest (HR) but actually sees it the way as if it was inclined towards the seat back (SB) from the right-side end. Additionally, for the same reason, the headrest (HR) is viewed as being dislocated at a point closer to the left-side end of seat back (SB). Those optical illusions, although explained from the plan view, are particularly enhanced as viewed in perspective, namely, in the three-dimensional state, in FIG. 1.

SUMMARY OF THE INVENTION

In view of the above-stated drawback, it is a purpose of the present invention to provide an improved arrangement for mounting a headrest in a seat, which avoids the illusional headrest inclination to allow the headrest to be viewed horizontally in parallel with the seat back in the eyes of a person looking thereat.

To achieve such purpose, according to the invention, there is provided such an arrangement that a headrest on a seat back is of a cantilever type having one single stay erected from an upper edge of the seat back to support the headrest at one side of the seat back, the headrest and seat back each having a uniformly expanded area such that its right-side and left-side half areas expand symmetrically relative to its central vertical line, with the central vertical lines of the headrest being coaxially aligned together, and a lower edge of the headest lies in parallel with the upper edge of the seat back, wherein the cantilever-type headrest presents an asymmetric spot in the symmetric arrangement of said headrest and seat back, causing thus such an optical illusion as if the headrest was inclined downwardly from the stay toward the upper edge of the seat back at a certain inclination angle, making illusively smaller a first distance between one free side of the headrest and the upper edge of the seat back than a second distance between another opposite side of the headrest and the upper edge of the seat back, such another opposite side of said headrest being adjacent to the stay, characterized in that the headrest per se is inclined at an angle compensating for the illusional headrest inclination so that the free side thereof is greater in distance from the upper edge of the seat back than such another side thereof to thereby offset the illusively small first distance, whereby the headrest is viewed as being disposed horizontally in parallel with the seat back in eyes of a person looking thereat.

Preferably, the stay may be stationary upon the upper edge of the seat back, and the headrest per se is angularly displaced by being rotated about a point at a top of the stay such as to be inclined, with respect to the stay, with respect to the stay, at an angle compensating for the foregoing illusional headrest inclination, thereby offsetting the illusively small first distance, while retaining unchanged the second distance.

A second purpose of the invention is to avoid such an optical illusion as if the headrest is dislocated from the central vertical line of seat back due to the asymmetric state of the cantilever-type headrest in the symmetry of both headrest and seat back.

To this end, according to the invention, it is so arranged that the central vertical line of the headrest is dislocated from that of said seat back to a point closer to one side of the seat back a distance compensating for the illusional headrest dislocation, so that the headrest is viewed as being disposed centrally of and over the seat back in eyes of a person looking thereat.

Preferably, the stay may be stationary on the upper edge of the seat back, and the headrest per se may be dislocated, with respect to the stay, such that its central vertical line is displaced from that of the seat back a distance compensating for the illusional headrest dislocation.

In another aspect of the invention, it may be arranged to achieve the above-described two compensations against both illusional headrest inclnation and dislocation, in combination.

DETAILED DESCRIPTION OF PREFERRED EMBODIMENTS OF THE INVENTION

At first, it should be understood that the present invention concerns an improvement on the conventional cantilever-type headrest arrangement in the prior art description above, and therefore all like designations in the prior art description correspond to all like designations given in the present description.

Figure 3:
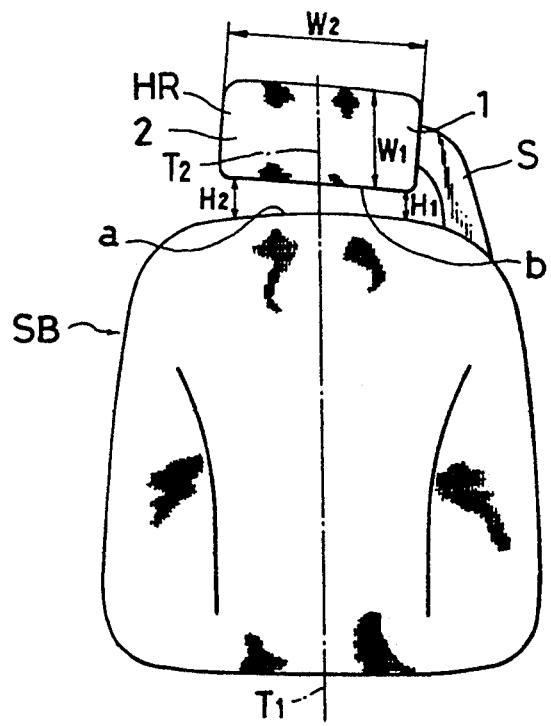
FIG. 3 is a front elevation view of a first embodiment of a headrest arrangement in accordance with the present invention.

Referring now to FIG. 3, there is shown a first embodiment of the invention which provides a solution to obviate the optical illusion problem inherit in the prior art headrest mounting arrangement on the seat back (SB). As stated earlier, the person's eyes, when seeing the whole appearance of headrest (HR) and seat back (SB), gets such an illusional vision that the headrest (HR) is inclined from the stay (S) downwardly to the upper edge (a) of seat back (SB) at a certain angle. It is noted of course that the headrest (HR) generally has a uniform area at its frontal surface, which is obtained by multiplying the height (W1) by the width (W2), the height (W1) being made uniform over the entire width (W2) so that the lower edge (b) of headrest lies in parallel with the upper edge (a) of seat back (SB). Also, as stated earlier, the headrest (HR) expands its both rightside and left-side areas symmetrically in relation to the central vertical axis (T1) and so does the seat back (SB).

Considering the asymmetric disposition of stay (S) as opposed to such symmetrical configuration of both headrest (HR) and seat back (SB), in accordance with the present embodiment, it is arranged such that the headrest (HR) per se is inclined upwardly from the stay (S) at an angle compensating for the foregoing illusional inclined angle, with the distance between the upper and lower edges (a)(b) respectively of the headrest (HR) and seat back (SB) being adjusted such that the rightside distance (H1) is fixed as it is and the left-side distance is extended greater than the distance (H1) into a new distance (H2). Importantly, the central vertical axis (T2) of thus-inclined headrest (HR) should be aligned with that (T1) of seat back (SB). With this arrangement, the symmetrically unstable point at the left side of seat back (SB), where there is no such headrest stay (S), is given a wider space as much as provision of another opposite stay therein.

It is thus observed that the headrest stay (S) is retained on the same point and with respect thereto, the headrest is adjusted in angle, while retaining the leftside distance (H1) as it is. This causes the headrest (HR) per se to be rotated about a point at a top end portion of the headrest stay (S), thereby compensating for the previously explained illusional inclination angle of headrest, with no change in the symmetry of both headrest and seat back relative to the common central line. Therefore, only such angular compensation of headrest (HR) actually offsets the illusional inclination of same, whereupon the headrest (HR) is viewed as if it was just disposed horizontally over or in parallel with the seat back (SB) in the eyes of a person looking at this improved arrangement of headrest upon the seat back.

The angular adjustment of headrest (HR) may be made arbitrarily, depending on a degree of illusional inclination of headrest which varies according to the respective sizes of headrest and seat back. Preferably, an experiment may be conducted on a assembled unit of headrest and seat back to determine a most suitable inclination of headrest, by gathering data from plural unidentified persons in terms of the illusion degrees.

Figure 4:
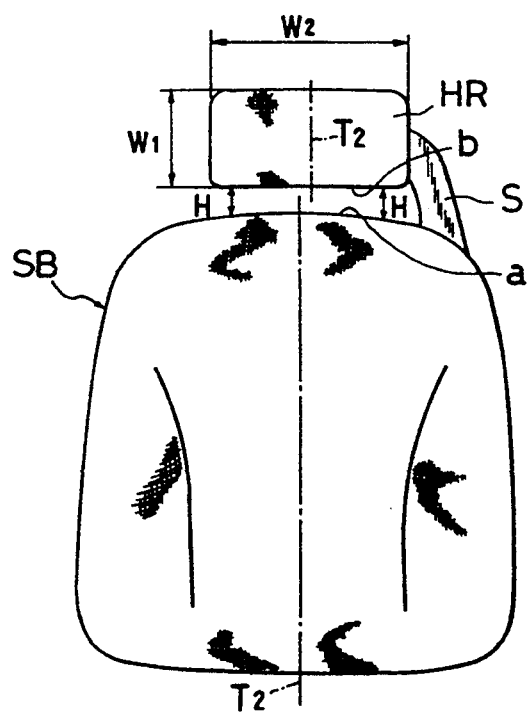
FIG. 4 is a front elevation view of a second embodiment of the invention.

FIG. 4 shows a second embodiment of the present invention. This embodiment addresses the illusional dislocation of headrest (HR) from the central vertical line as raised in the prior art description. Namely, as discussed earlier, on the whole symmetrically expanded configuration of headrest and seat back, the presence of right-side stay (S) causes, in the eyes of person, such an optical illusion as if the headrest (HR) was dislocated a certain distance to the left side of seat back (SB). Taking this illusion to mean that the central vertical line (T1) of headrest (HR) is dislocated that distance from that (T2) of seat back (SB), according to the present embodiment, the headrest (HR), whose height (W1) is uniform along its entire width (W2), is located with respect to the stay (S) so as to displace the vertical line (T1) of headrest (HR) from the main vertical line (T2) to the left side of seat back (SB) by a distance compensating for the foregoing distance. In this embodiment, the stay (S) stands stationary at the same point as similar to the first embodiment, while retaining the distance (H1) between the headrest lower edge (b) and seat back upper edge (a).

Accordingly, the above arrangement is effective in offsetting the illusional eccentricity of headrest (HR) caused by the right-side stay (S) relative to the seat back (SB), and providing such an optical effect as if the headrest was located centrally of seat back.

Figure 1:
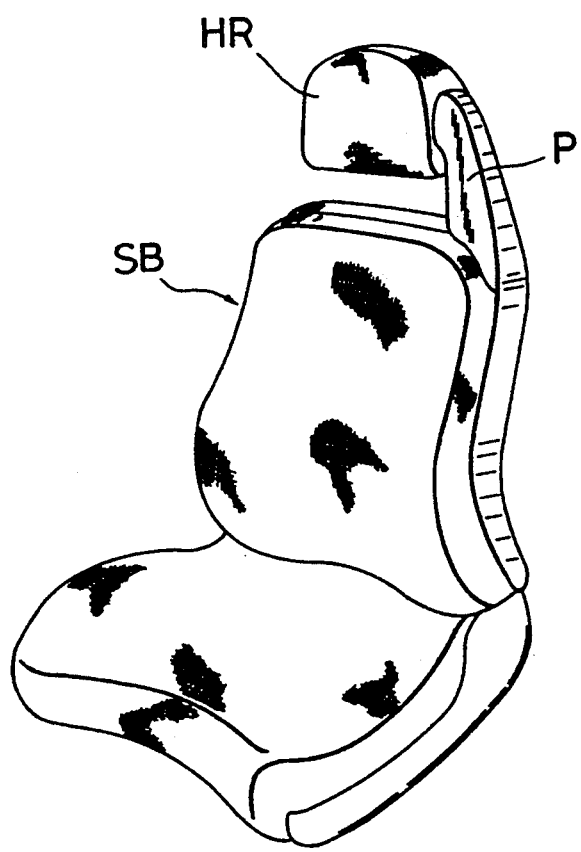
FIG. 1 is a perspective view of a conventional seat with a cantilever-type headrest.
Figure 2:
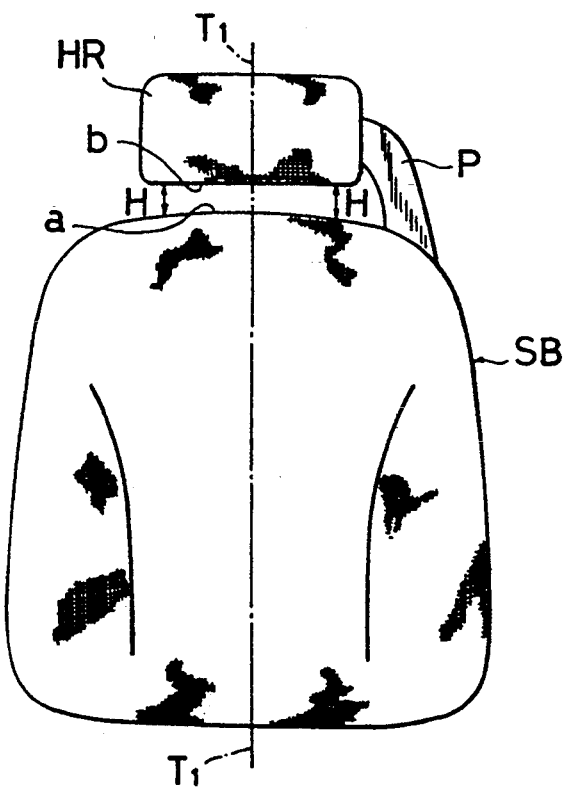
FIG. 2 is a front elevation view of seat back and headrest of the conventional seat.
Figure 5:
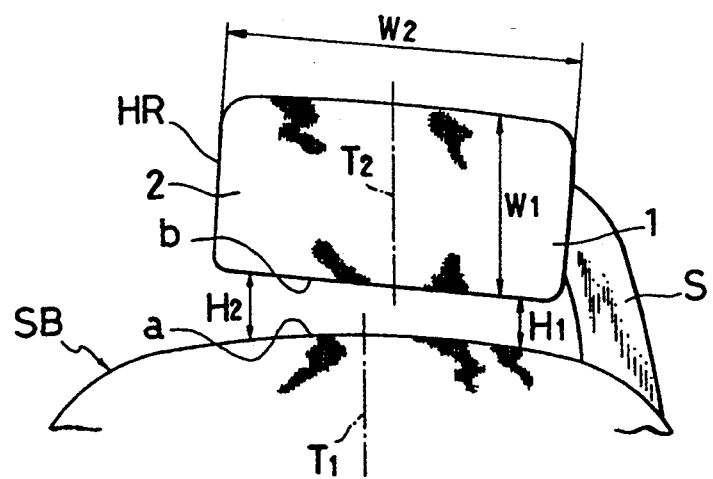
FIG. 5 is a a partially enlarged front elevation view of a third embodiment of the invention.

FIG. 5 shows a third embodiment of the present invention. According thereto, the headrest (HR) is so arranged upon the seat back (SB) that the free end side (2) thereof is inclined at an angle compensating for the illusional inclination angle with respect to the stationary stay (S), thereby increasing the left-side distance (H2) between the headrest lower edge (b) and seat back upper edge (a), and further the headrest (HR) is dislocated to a point closer to the side of stay (S), with the central vertical line of headrest being dislocated from that of seat back (SB). In that way, a compensation is made to both two optical illusions mentioned above, so that the headrest (HR) may be viewed centrally of and in parallel with the seat back (SB). Thus, the present embodiment entails both advantages of the foregoing first and second embodiments.

With regard to the second and third embodiments, adjustment may be arbitrarily done for determining inclination angle of headrest with respect to the seat back (SB) and dislocation degree of same from the central vertical line (T2) of seat back (SB), depending on a degree of the respective associated illusion effects. Preferably, an experiment may be made for those determinations by gathering dada from plural unidentified persons in terms of the illusion degrees and suitable compensation degrees thereto.

Finally, it may also be arranged such that the both headrest (HR) and stay (S) are both so inclined as to compensate for the foregoing illusional headrest inclination and dislocated so that the central vertical line (T1) of headrest (HR) is displaced from that (T2) of seat back (SB) a distance compensating for the foregoing illusional headrest eccentric dislocation, in order to achieve the same effects as in the above there embodiments.

What is claimed is:

1. An arrangement for mounting a headrest in a seat, in which said seat includes a seat back, and said headrest is of a cantilever-type having one single stay erected from an upper edge of said seat back, said headrest and seat back each having a uniformly expanded area such that its right-side and left-side half areas expand symmetrically relative to its central vertical line, with both central vertical lines of said headrest and seat back being aligned together, said stay being erected from said seat back adjacent a first side of said headrest such that the other side of said headrest is free, wherein said headrest is inclined upwardly relative to said stay at an angle so that the said free side of said headrest lies a greater distance from said upper edge of said seat back than said first side of said headrest, the inclination of said headrest offsetting an optical illusion that the headrest was inclined downwardly from said stay toward said upper edge of said seat back at a certain inclination angle if said headrest was positioned with its lower edge parallel with said upper edge of said seat back, making illusively smaller a first distance between said free side of said headrest and said upper edge of said seat back than a second distance between said first side of said headrest and said upper edge of said seat back, such that the headrest appears disposed horizontally in parallel with said upper edge of said seat back.

* * * * *